(12) United States Patent
Sobczak et al.

(10) Patent No.: US 6,413,011 B1
(45) Date of Patent: Jul. 2, 2002

(54) METHOD FOR PRODUCING FAST-DRYING MULTI-COMPONENT WATERBORNE COATING COMPOSITIONS

(75) Inventors: Jeffrey Joseph Sobczak, Coatesville, PA (US); Angelo Sanfilippo, Biot (FR); Ann Robertson Hermes, Ambler; Donald Craig Schall, Lansdale, both of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/579,186

(22) Filed: May 26, 2000

Related U.S. Application Data

(60) Continuation-in-part of application No. 09/267,328, filed on Mar. 12, 1999, now Pat. No. 6,132,132, which is a division of application No. 08/807,858, filed on Feb. 26, 1997, now Pat. No. 5,947,632.

(51) Int. Cl.$^7$ .............................................. E01C 11/24
(52) U.S. Cl. ......................................... 404/72; 427/137
(58) Field of Search .............................. 427/331, 385.5, 427/372.2, 137; 521/28; 523/172; 404/72; 106/31.05

(56) References Cited

U.S. PATENT DOCUMENTS

| | | | |
|---|---|---|---|
| 3,494,878 A | 2/1970 | Harren et al. ................. 260/2.2 |
| 3,661,815 A | 5/1972 | Smith ......................... 260/17.4 |
| 3,784,391 A | 1/1974 | Kruse et al. ................. 106/170 |
| 3,887,756 A | * 6/1975 | Gerstin et al. ........... 428/424.8 |
| 3,935,099 A | 1/1976 | Weaver et al. ................. 210/43 |
| 3,959,569 A | 5/1976 | Burkholder, Jr. ............. 428/475 |
| 4,076,663 A | 2/1978 | Masuda et al. ............. 260/17.1 |
| 4,124,748 A | 11/1978 | Fujimoto et al. ................ 526/8 |
| 4,230,609 A | * 10/1980 | Burroway et al. ........... 524/251 |
| 4,286,082 A | 8/1981 | Tsubakimoto et al. ...... 526/240 |
| 4,389,513 A | 6/1983 | Miyazaki .................... 525/186 |
| 4,427,836 A | 1/1984 | Kowalski et al. ........... 525/301 |
| 4,469,825 A | 9/1984 | Kowalski et al. ........... 523/201 |
| 4,594,363 A | 6/1986 | Blankenship et al. ......... 521/64 |
| 4,650,716 A | 3/1987 | Gelman ....................... 428/402 |
| 4,654,039 A | 3/1987 | Brandt et al. ................ 604/368 |
| 4,689,408 A | 8/1987 | Gelman et al. ................ 536/98 |
| 4,752,502 A | * 6/1988 | Winchester ................. 427/137 |
| 4,798,691 A | 1/1989 | Kasai et al. .................. 264/47 |
| 4,880,842 A | 11/1989 | Kawalski et al. .............. 521/64 |
| 4,906,717 A | 3/1990 | Cretenot et al. ............. 526/312 |
| 4,908,271 A | 3/1990 | Kasai et al. ................. 428/402 |
| 4,972,000 A | 11/1990 | Kawashima et al. .......... 521/54 |
| 5,075,399 A | 12/1991 | Ahmed et al. ............... 526/287 |
| 5,494,971 A | 2/1996 | Blankenship ............... 525/301 |
| 5,672,379 A | * 9/1997 | Schall et al. ................. 427/137 |
| 5,804,627 A | 9/1998 | Landy et al. ................. 524/314 |
| 5,824,734 A | 10/1998 | Yang .......................... 524/555 |
| 5,849,856 A | * 12/1998 | Kawamura et al. ............ 528/49 |
| 5,854,338 A | * 12/1998 | Hovestadt et al. ........... 524/591 |
| RE36,042 E | * 1/1999 | Landy et al. ................. 524/521 |
| 5,861,188 A | * 1/1999 | Schall et al. ................. 427/137 |
| 5,907,003 A | * 5/1999 | Blot et al. ................... 523/522 |
| 5,922,398 A | 7/1999 | Hermes et al. .............. 427/137 |
| 5,947,632 A | 9/1999 | Pirotta et al. .................. 404/9 |
| 6,207,742 B1 | * 3/2001 | Boldt .......................... 524/494 |

FOREIGN PATENT DOCUMENTS

| | | | |
|---|---|---|---|
| DE | 2210 007 | * | 9/1973 |
| DE | 2 612 846 | * | 10/1976 |
| DE | 41 01 527 | * | 7/1992 |
| EP | 00 68 189 B1 | | 6/1982 |
| EP | 0 066 108 | * | 12/1982 |
| EP | 0 200 249 B1 | | 4/1986 |
| EP | 0 304 143 B1 | | 4/1988 |
| EP | 0 409 459 B2 | | 7/1990 |
| EP | 0811663 A | | 12/1997 |
| EP | 0 915 108 A1 | | 10/1998 |
| EP | 0950763 A | | 10/1999 |
| JP | 1185311 A | | 7/1980 |
| JP | 55108407 A | | 8/1980 |
| JP | 55133413 | | 10/1980 |
| JP | 58154709 | | 9/1983 |
| JP | 58154710 | | 9/1983 |
| JP | 62127336 | | 6/1987 |
| JP | 2140272 A | | 5/1990 |
| JP | 62156387 | | 7/1998 |

OTHER PUBLICATIONS

Emulsion Polymerization of Acrylic Monomers, Feb. 1997, Rohm and Haas Company.

* cited by examiner

*Primary Examiner*—Gary S. Hartmann

(57) ABSTRACT

A method for producing a fast-drying two or multi-component waterborne coating on a surface of a substrate is disclosed. The method includes applying a first component containing a binder composition, and a second component, being separate from the first component prior to application, including an absorber.

22 Claims, No Drawings

METHOD FOR PRODUCING FAST-DRYING MULTI-COMPONENT WATERBORNE COATING COMPOSITIONS

This application is a continuation-in-part application of Ser. No. 09/267,328, filed Mar. 12, 1999 now U.S. Pat. No. 6,132,132 which is a divisional of Ser. No. 08/807,858 filed on Feb. 26, 1997 issued as U.S. Pat. No. 5,947,632.

The present invention relates to a method for producing fast-drying multi-component waterborne coating compositions, particularly traffic paints or road markings. The invention also relates to the compositions of fast-drying multi-component waterborne coatings, particularly traffic paints or road markings. Used herein, the term "multi-component" refers to traffic paints having two or more components applied to a substrate in one or more steps.

One of the many important features of coatings in general, and road markings or traffic paints in particular, is the speed at which they dry on the surface of a particular substrate after application. For instance, the drying speed of a traffic paint dictates the length of the period of disruption to road traffic during application of the paint to road surfaces, and subsequent drying. The trend is to demand shorter and shorter disruptions of traffic flow, meeting this demand by using fast-drying paint. Used herein, the terms "coating" and "paint" will be used interchangeably and referred to as a general class including traffic paints and road markings. In addition, the terms "traffic paint" and "road marking" are used interchangeably herein.

Solvent-based fast-drying coatings are based on organic polymeric resins (also frequently called binders) dissolved, suspended or otherwise dispersed in relatively low boiling organic solvents. Low-boiling volatile organic solvents evaporate rapidly after application of the paint on the road to provide the desired fast-drying characteristics of a freshly applied road marking. However, in addition to releasing volatile organic solvents into the environment, spreading of the paint formulation tends to expose the workers to the vapors of the organic solvents. Because of these shortcomings and increasingly stringent environmental mandates from governments and communities, it is highly desirable to develop more environmentally friendly coatings or paints while retaining fast-drying properties and/or characteristics.

More environmentally friendly coating use water based, i.e., waterborne, rather than solvent based polymers or resins. Coating formulations, both solvent based and waterborne, include binder polymers. The term binder polymer used herein refers to polymers that are included in the coating composition and that augment or participate in film formation and in the composition of the resultant film. Binder polymers typically have Tg values in the range −10° C. to 70° C., because those having Tg values below −10° C. tend to have poor resistance to dirt pick-up and those having Tg values above 70° C. usually display diminished ability to form films. In certain applications, however, the lower limit for Tg can be even lower than −10° C. For example, the binder polymers used in roof coatings can have glass transition temperatures (Tgs) as low as −40° C. Used herein, "Tg" is an abbreviation for glass transition temperature. The glass transition temperature, Tg, of a polymer is the temperature at which a polymer transitions from a rigid, glassy state at temperatures below Tg to a fluid or rubbery state at temperatures above Tg. The Tg of a polymer is typically measured by differential scanning calorimetry (DSC) using the mid-point in the heat flow versus temperature transition as the Tg value. A typical heating rate for the DSC measurement is 20° C. per minute.

Primarily due to a combination of high boiling point, high latent heat of vaporization, high polarity, and strong hydrogen bonding of water, drying times of waterborne paints or coatings are generally longer than those exhibited by the organic solvent based coatings. The drying time strongly depends on the relative humidity of the atmosphere in which the coatings are applied. A waterborne paint may take several hours or more to dry in high humidity. The problem of retarded drying rate is especially aggravated for thick film (greater than about 500μ) traffic markings. Long drying times severely limit the desirability of using waterborne paints, particularly traffic paints and road marking paints because of longer traffic disruptions.

In an attempt to produce waterborne coating compositions with shorter drying times, i.e., "fast-drying" coatings, methods utilizing salt, or acid, or combinations thereof to induce coagulation have been devised, as have pH sensitive binder systems.

EP-B-0,409,459 discloses an aqueous coating composition including an anionically stabilized emulsion polymer having Tg no lower than 0° C., a polyamine functional polymer, and a volatile base in an amount such that the composition has a pH where substantially all of the polyamine functional polymer is in a non-ionic state, and wherein more than 50% by weight of the polyamine functional polymer will be soluble at pH values of 5 to 7 on evaporation of the volatile base. In the non-ionic state (i.e., deprotonated), polyamine interaction with the anionically stabilized emulsion and any other anionic ingredients which may be present in the composition is eliminated. The volatile base must be volatile enough to be released under air drying conditions. In the absence of the volatile base, the protonated amine moieties interact with the anionic ingredients to destabilize the coating composition. U.S. Pat. Nos. 5,804,627, 5,824,734, and U.S. Pat. No. 5,922,398 all disclose coating compositions having latent instability that may be triggered by adjustment of some property such as pH.

U.S. Pat. No. 5,947,632 discloses waterborne coating compositions including a number of general categories of materials including talc, hollow sphere polymer, a solid polymer (e.g., ion exchange resin beads in acid, sodium or potassium form) and inorganic compounds (e.g., inorganic superabsorbent gel, Sumica gel). These materials share the characteristic that they speed the drying of coatings when applied either in the same first step with the waterborne binder, or in a subsequent step. U.S. Pat. No. 5,947,632 also discloses incorporation of glass beads into the waterborne coating compositions. Glass beads impart retro-reflective characteristics to traffic paints and traffic markings, and can also serve as fillers for coating compositions. Other additives such as anti-skid material are also disclosed As used herein, the term "absorber" refers to the general class of materials that includes hollow sphere polymer, ion exchange resin beads (e.g., in acid form, in base form, in salt form, in partially neutralized form, or in mixed salt form), absorbent inorganic compounds (e.g., inorganic superabsorbent gel, Sumica gel), including talc, molecular sieves, non-porous carbonaceous materials, porous carbonaceous materials, and superabsorbent polymers (abbreviated SAP or SAPs herein).

The coating compositions of U.S. Pat. No. 5,947,632 do provide shorter drying times. These compositions are based on aqueous binder compositions that are defined herein as "fast-drying aqueous binder compositions". These "fast-drying aqueous binder compositions" include specially modified binder polymers. Such binder polymers may be of a single type in which the polymer chains bear one or more kinds of specialized functionality designed to provide destabilization of the coating composition upon application to a substrate. Alternatively, the binder polymers may be of more than one type, each type bearing a particular kind of specialized functionality. In both of these cases, binder polymer that bears no such specialized functionality may also be present. For example, a typical fast-drying aqueous binder composition may include: a film forming binder polymer that bears no functionality designed to accelerate drying rate; one or more polymers bearing such functionality capable of inducing destabilization of the composition; and other ingredients designed to interact with the polymers bearing such functionality to bring about destabilization and, hence, accelerated drying upon application to a substrate. In a more specific example, a film forming polymer may be stabilized in water by an anionic surfactant. That aqueous dispersion may also contain another polymer that is a polyamine functional polymer and a volatile base such as ammonia or volatile amine in sufficient quantity to assure that the amino groups of the polyamine functional polymer are deprotonated. Upon application of this fast-drying aqueous binder composition to a substrate, the volatile base evaporates, allowing the amino groups of the polyamine functional polymer to become protonated, forming positively charged ammonium groups. These cationic ammonium groups then associate with the anionic surfactant molecules, rendering those anionic surfactant molecules incapable of continuing to stabilize the particles of film forming polymer. Once the system is destabilized in this way, drying is accelerated.

While the fast-drying aqueous binder compositions, with or without the addition of absorbers, do often provide for the acceleration of drying needed during application of traffic marking paint, they suffer from important drawbacks that exclude them from certain markets. Because polymers having the specialized functionality required to augment drying are more expensive than those designed simply to impart film forming character, the fast-drying aqueous binder compositions are inherently more expensive than slow-drying aqueous binder compositions. The added expense derives not only from the higher cost of the specialized monomers used to introduce the specialized functionality, but also from the added labor and capital equipment costs mandated by preparation, storage, and blending of multiple types of polymers. These higher manufacturing costs dictate that road marking paints containing fast-drying aqueous binder compositions be offered at prices that may exclude them from some markets in which there is great demand for some, but not all, of their performance capability. The excluded markets are often in rural areas where traffic flow is very light such that a road marking paint exhibiting some, but not all, of the drying speed of paints based on both fast-drying aqueous binder compositions and absorbers would be acceptable.

It is also the case that, in many of the markets confined to using low-price road marking paints, both the equipment and the personnel are less sophisticated than in the markets that can support higher prices. In these low-price markets, if specific conditions of storage and handling cannot be met, the use of fast-drying aqueous binder compositions can be problematic. Problems include those attributable to escape of volatile base (e.g., ammonia) during handling and storage of fast-drying compositions. Premature loss of volatile base can result in skinning over of the surface of the fast-drying coating composition while in the storage or application container. Premature loss of volatile base can also cause gel formation in part or all of the coating composition prior to application to the substrate (e.g., road) surface. Further, the high pH of these systems may render less expensive storage and application equipment vulnerable to corrosion damage. Acceptable, but much more expensive, alternative materials of construction (e.g., stainless steel) for such equipment are often not an option in the low-price markets.

U.S. Pat. No. 3,494,878 discloses a coating composition that does contain ion exchange resin (IER) beads combined with a slow-drying coating composition. This IER containing coating composition is a storage stable paint formulation that, once applied, resists staining by color bodies in the underlying substrate. Sequestration of these color bodies is achieved through the addition of IER to the coating composition prior to storage, shipment, and use. Just as it is an essential feature of U.S. Pat. No. 3,494,878 that the IER particles be present at a high enough level to be effective against staining, it is also essential that the resultant paint formulation be stable during storage and shipment. Stability is achieved by minimizing the solids level of the paint, minimizing the IER concentration in the paint, and increasing the concentration of stabilizing components such as surfactants. Unfortunately, all of these important elements for creating stability render the resultant IER containing paint wholly ineffective as a fast-drying system. Furthermore, all potential that an IER particle might have for accelerating the drying of a coating composition is forfeited during the first few seconds, or minutes of mixing the IER particles into the coating composition.

We have, however, unexpectedly discovered that slower-drying aqueous binder compositions may be combined with absorber to achieve fast-drying multi-component waterborne coating compositions. This newfound ability to use slower-drying aqueous binder compositions that are less expensive and not prone to destabilization during storage and handling opens important new markets for fast-drying multi-component waterborne coating compositions.

Used herein, component A includes at least one water insoluble absorber and component B includes a slow-drying aqueous binder composition. Also used herein, whenever a sequence of steps in a method includes two components, each of which includes a slow-drying aqueous binder composition, one of the components will be designated as component B and the other as component C. Components B and C may be identical to one another, or they may differ in composition. The present invention relates to a method for preparing a fast-drying multi-component waterborne coating on a surface of a substrate, comprising the steps of:

applying component A and component B, either simultaneously, or nearly simultaneously, to the surface of said substrate, wherein
      a) said component A comprises at least one water insoluble absorber; and
      b) said component B comprises a slow-drying aqueous binder composition; and
    allowing the multi-component waterborne coating to dry, wherein said absorber is selected from the group consisting of organic super absorbent polymers, ion-exchange resins, hollow sphere polymers, molecular sieves, talcs, inorganic absorbers, porous carbonaceous materials, non-porous carbonaceous materials, and mixtures thereof.

This method may further include the additional sequential step of applying component C including a slow-drying aqueous binder composition to the surface of the substrate to which component A and component B have been applied.

The present invention is also directed to a method for preparing a fast-drying multi-component waterborne coating on a surface of a substrate, the method including the sequential steps of:

a) applying component A including at least one water insoluble absorber to the surface of the substrate;

b) applying component B including a slow-drying aqueous binder composition to the surface of the substrate to which the water insoluble absorber has been applied; and c) allowing the multi-component waterborne coating to dry, wherein the absorber is selected from the group consisting of organic super absorbent polymers, ion-exchange resins, hollow sphere polymers, molecular sieves, talcs, inorganic absorbers, porous carbonaceous materials, non-porous carbonaceous materials, and mixtures thereof.

The method may further include the additional sequential step of applying component C including a slow-drying aqueous binder composition to the surface of the substrate before applying component A water insoluble absorber, or the method may include the additional sequential step of applying component C including a slow-drying aqueous binder composition to the surface of the substrate to which component A and component B have been applied.

Another aspect of the present invention includes a method for preparing a fast-drying multi-component waterborne coating on a surface of a substrate, the method including the sequential steps of:

a) applying component B including a slow-drying aqueous binder composition to the surface of a substrate;

b) applying component A including at least one water insoluble absorber to the surface of the substrate to which component B has been applied; and c) allowing the multi-component waterborne coating to dry, wherein the absorber is selected from the group consisting of organic super absorbent polymers, ion-exchange resins, hollow sphere polymers, molecular sieves, talcs, inorganic absorbers, porous carbonaceous materials, non-porous carbonaceous materials, and mixtures thereof. This method may further include applying component C slow-drying aqueous binder composition simultaneously, or nearly simultaneously, with component A.

In a still further aspect of the present invention, glass beads are included with any of components A, B, and C in any of the steps of applying those components or in a separate step preceding, between, or following the steps of applying components A, B, and C.

Multiple coat systems are also an aspect of the present invention. Used herein, "multiple coat system" refers to combinations of any of the series of application steps explicitly described herein. For example, sequential steps of application of components C, A, and B could be followed by sequential steps of application of components A, B and G.

The present invention also includes the composites formed by any of the methods of the invention. The multi-component waterborne coating of the present invention can, specifically, be a multi-component waterborne road marking paint.

The present invention can be used in many coating, painting or marking applications. For instance, the method and composition of the present invention can be used for traffic paints, road markings, house paints, maintenance coatings for exterior or interior surfaces of buildings, walls, roofs, and other structures. The surface of the substrate may be wood, metal (such as aluminum, steel and others) polymers, plaster and others. Other applications include coating metal substrates present in a wide variety of manufactured articles such as signs, boats, cars, etc. All of the substrates may already have one or more layers of existing coating or paint which may be fresh or aged.

It is generally desirable to have additional components added to the coating composition to form the final formulation for traffic paints or other coatings described herein. These additional components include, but are not limited to, thickeners; rheology modifiers; dyes; sequestering agents; biocides; dispersants; pigments, such as, titanium dioxide, organic pigments, carbon black; extenders, such as calcium carbonate, talc, clays, silicas and silicates; fillers, such as glass or polymeric microspheres, quartz and sand; anti-freeze agents; plasticizers; adhesion promoters such as silanes; coalescents; wetting agents; surfactants; slip additives; crosslinking agents; defoamers; colorants; tackifiers; waxes; preservatives; freeze/thaw protectors; corrosion inhibitors; and anti-flocculants.

The term "road" is used herein as a generic term and it includes any indoor or outdoor solid surface that is or may be exposed to pedestrians, moving vehicles, tractors, or aircraft continuously, constantly or intermittently. Some non-limiting examples of a "road" include highways, streets, driveways, sidewalks, runways, taxiing areas, tarmac areas, parking lots, roof tops, indoor floors (such as factory floors, inside a shopping mall, etc), and others. The surface material may be masonry, tar, asphalt, resins, concrete, cement, stone, stucco, tiles, wood, polymeric materials and combinations thereof. It is also within the scope of the invention to apply such a two- or multi-component waterborne coating over another one or more layers of fresh or aged coating or marking already applied on the surface.

The term "fast-drying" is used herein to mean that a film of a so designated coating composition having a wet coating thickness of 330 microns displays a dry-through time of less than two hours at 90 percent relative humidity at 23° C. when applied without inclusion of absorbers. The term "fast-drying aqueous binder composition" refers to an aqueous dispersion of at least one binder polymer that, when applied to a substrate, forms a film having a dry-through time conforming to the definition of "fast-drying" just given.

The term "slow-drying aqueous binder composition" is used herein to mean an aqueous dispersion of at least one binder polymer that, when applied to a substrate, forms a film having a dry through time equal to or greater than two hours at 90 percent relative humidity at 23° C. when applied at 330 microns film thickness without inclusion of absorbers. It is also within the present invention that addition of an absorber to a "slow-drying aqueous binder composition" at some point during or after application to a substrate can produce a "fast-drying multi-component waterborne coating composition".

In the present invention, accelerated drying may occur on the surface of the film, partially or-throughout the depth of the film, or combinations thereof. The increased drying rate can be observed or determined by analyzing and/or measuring the surface dry time, or dry-to-touch time, or dry-to-no-pickup time, the dry-through time, the water-resistance or rain-resistance, or other properties of the freshly applied paint. ASTM test methods are useful for determining drying rates. Especially useful is ASTM Method D 1640 directed at "Test methods for drying, curing, or film formation of organic coatings at room temperature". Also useful are the test methods for determining dry-through time defined herein below for Examples 1–3.

The polymer of the present invention is referred to herein as the "binder polymer". The specific method by which a binder polymer is prepared is not of particular importance to the present invention. Binder polymers useful in slow-drying aqueous binder compositions may be prepared via bulk and solution polymerization, and by aqueous dispersion, suspension, and emulsion polymerization, or any other method that would produce the desired polymer soluble, partially soluble, or dispersed in water or a mixture of water and a water-miscible solvent, or capable of being dissolved, partially dissolved, or dispersed in water or a mixture of water and a water-miscible solvent. A preferred method for preparing the binder polymers to be used in the slow-drying aqueous binder compositions of the present invention is aqueous emulsion polymerization. Polymers thus prepared are usually stabilized by adding anionic, nonionic, or cationic surfactants, or by the incorporation of anionic or cationic moieties into the polymer itself during synthesis. The emulsion polymerization can be carried out by a number processes such as those described in Blackley, D. C. *Emulsion Polymerisation*; Applied Science Publishers: London, 1975; Odian, G. *Principles of Polymerization*; John Wiley & Sons: New York, 1991; *Emulsion Polymerization of Acrylic Monomers*; Rohm and Haas, 1967.

Anionically stabilized polymer particles can, for example, be prepared from a wide range of acrylic and methacrylic monomers, including C1–C18 (meth)acrylate esters, methyl (meth)acrylate, ethyl (meth)acrylate, isomers of propyl (meth)acrylate, isomers of butyl (meth)acrylate, 2-ethylhexyl (meth)acrylate, isobornyl (meth)acrylate, isodecyl (meth)acrylate, oleyl (meth)acrylate, palmityl (meth)acrylate, stearyl (meth)acrylate, 2-hydroxyethyl (meth)acrylate, 3-hydroxypropyl (meth)acrylate, 4-hydroxybutyl (meth)acrylate, glycidyl (meth)acrylate; acid functional monomers, such as, acrylic acid, methacrylic acid, crotonic acid, itaconic acid, fumaric acid and maleic acid; monomethyl itaconate; monomethyl fumarate; monobutyl fumarate; maleic anhydride; acrylamide or substituted acrylamides; (meth)acrylonitrile; sodium vinyl sulfonate; phosphoethyl (meth)acrylate; acrylamido propane sulfonate; diacetone acrylamide; acetoacetylethyl methacrylate; acrolein and methacrolein; dicyclopentadienyl methacrylate; dimethyl meta-isopropenylbenzyl isocyanate; isocyanatoethyl methacrylate; styrene or substituted styrenes; butadiene; ethylene; vinyl acetate or other vinyl esters; vinyl monomers, such as, for example, vinyl halide, preferably vinyl chloride, vinylidene halide, preferably vinylidene chloride, N-vinyl pyrrolidone; amino monomers, such as, for example, N,N-dimethylaminoethyl (meth)acrylate, N,N-dimethylaminopropyl methacrylamide, and oxazolidinoethyl methacrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

Optionally, a low level of a multi-ethylenically unsaturated monomer such as, for example, 0–5% by weight based on the weight of the dry polymer of allyl (meth)acrylate, diallyl phthalate, 1,4-butylene glycol di(meth)acrylate, 1,6-hexanediol di(meth)acrylate, and trimethylolpropane tri (methyl)acrylate may be used subject to maintaining a sufficiently low level of crosslinking that, in the case of solution polymers, unmanageable viscosity is not attained, or that, in the case of emulsion polymers, effective film formation is not compromised. The terms "coating", "film", and "coating film" are used interchangeably herein, and refer to the film that forms and dries as a layer on the surface of a substrate.

Conventional surfactants may be used to stabilize the emulsion polymerization systems before, during, and after polymerization of monomers. These conventional surfactants will usually be present at levels of 0.1 percent to 6 percent by weight based on the weight of total monomer. At least one anionic, nonionic, or amphoteric surfactant may be used, or mixtures thereof. Alternatively, all, or a portion, of the particle stabilization may be provided by initiator fragments, such as those of persulfates, when the fragments become incorporated into the polymer chain. Examples of anionic emulsifiers include sodium lauryl sulfate, sodium dodecyl benzene sulfonate, dioctylsulfosuccinate, sodium polyoxyethylene lauryl ether sulfate, sodium dodecyl diphenyloxide disulfonate and other diphenylsulfonate derivatives, and sodium salt of tert-octylphenoxyethoxypoly (39)ethoxyethyl sulfate. Examples of nonionic surfactants include glycerol aliphatic esters, oleic acid monoglyceride, polyoxyethylene aliphatic esters, polyoxyethylene glycol monostearate, polyoxyethylene cetyl ether, polyoxyethylene glycol monolaurate, polyoxyethylene glycol monooleate, polyoxyethylene glycol stearate, polyoxyethylene higher alcohol ethers, polyoxyethylene lauryl ether, polyoxyethylene nonylphenol ether, polyoxyethylene octylphenol ether, polyoxyethylene oleyl ether, polyoxyethylene stearyl ether, polyoxyethylenesorbitan aliphatic esters, polyoxyethylenesorbitan monolaurate, polyoxyethylenesorbitan monooleate, polyoxyethylenesorbitan monopalmitate, polyoxyethylenesorbitan monostearate, polyoxyethylenesorbitan trioleate, polyoxyethylenesorbitan tristearate, polyoxyethylenesorbitol tetraoleate, stearic acid monoglyceride, tert-octylphenoxyethylpoly(39)ethoxyethanol, and nonylphenoxyethylpoly(40)ethoxyethanol.

Amphoteric surfactants may also be utilized solely, or in combination with anionic, nonionic, or mixtures thereof, to stabilize particles of the polymer during and after aqueous emulsion polymerization, or other dispersion polymerizations. For the purpose of stabilizing particles of polymer in aqueous systems, amphoteric surfactants may be used at levels of 0.1 percent to 6 percent by weight based on the weight of total monomer. Useful classes of amphoteric surfactant include aminocarboxylic acids, amphoteric imidazoline derivatives, betaines, and macromolecular amphoteric surfactants. Amphoteric surfactants from any of these classes may be further substituted with fluorocarbon substituents, siloxane substituents, or combinations thereof. Useful amphoteric surfactants can be found in Amphoteric Surfactants, ed. B. R. Bluestein and C. L. Hilton, Surfactant Series Vol. 12 Marcel Dekker N.Y., N.Y. (1982).

Initiation of emulsion polymerization may be carried out by the thermal decomposition of free radical precursors, also called initiators herein, which are capable of generating radicals suitable for initiating addition polymerization. Suitable thermal initiators such as, for example, inorganic hydroperoxides, inorganic peroxides, organic hydroperoxides, and organic peroxides, are useful at levels of from 0.05 percent to 5.0 percent by weight, based on the weight of monomers. Free radical initiators known in the art of aqueous emulsion polymerization include water-soluble free radical initiators, such as hydrogen peroxide, tert-butyl peroxide; alkali metal (sodium, potassium or lithium) or ammonium persulfate; or mixtures thereof Such initiators may also be combined with reducing agents to form a redox system. Useful reducing agents include sulfites such as alkali metal meta bisulfite, or hyposulfite, sodium thiosulfate, or sodium formaldehyde sulfoxylate. The free radical precursor and reducing agent together, referred to as a redox system herein, may be used at a level of from about 0.01% to 5%, based on the weight of monomers used. Examples of redox systems include t-butyl hydroperoxide/ sodium formaldehyde sulfoxylate/Fe(II) and ammonium persulfate/sodium bisulfite/sodium hydrosulfite/Fe(II). The polymerization temperature may be 10° C. to 110° C., depending upon such things as free radical initiator decomposition constant and reaction vessel pressure capabilities.

Frequently, a low level of chain transfer agent such as a mercaptan (for example: n-octyl mercaptan, n-dodecyl mercaptan, butyl or methyl mercaptopropionate, mercaptopropionic acid at 0.05 to 6% by weight based on total weight of monomer) is employed to limit the formation of any significant gel fraction or to control molecular weight.

When the binder polymer is present as emulsion polymer particles, those particles have a particle size of 50 to 2,000 nanometers (nm), more preferably, 50 to 1000 nm, and, most preferably, 50 to 700 nm. Particle sizes can be measured by microscopy, or by using the Brookhaven Model BI-90 Particle Sizer supplied by Brookhaven Instruments Corporation, Holtsville, N.Y., which employs a quasi-elastic light scattering technique to measure the size of the particles. All of these particle size ranges are inclusive and combinable.

Absorbers suitable for use in component A of the present invention are preferably water insoluble. However, it is possible for an absorber of the present invention to be effective even if a portion of that absorber is susceptible to dissolution upon addition to the aqueous system. "Water insoluble" is defined herein as having a solubility of less than 0.5 grams of the absorber per 100 grams of water at 20° C. More preferably, the solubility is less than 0.1 gram of the absorber per 100 grams of water at 20° C., and most preferably the solubility is less than 0.05 gram of the absorber per 100 grams of water at 20° C. All of these solubility ranges are inclusive and combinable.

Many absorbers having liquid or gas absorption or adsorption properties may be used for the present invention. The absorbers should be able to adsorb and/or absorb small polar molecules like water, ammonia, $C_1$–$C_6$ alkyl amines, $C_1$–$C_6$ alkyl alcohols, or a combination thereof. It is preferred that an absorber is has a substantial number of polar sites per gram of absorber or per square meter of surface area and these polar sites can interact or react with small polar molecules such as water, ammonia, $C_1$–$C_6$ alkyl alcohols, $C_1$–$C_6$ alkyl amines, and mixtures thereof. Examples of absorbers include organic super absorbent polymers, ion-exchange resins, hollow sphere polymers, molecular sieves, inorganic absorbents, porous carbonaceous materials, non-porous carbonaceous materials, and mixtures thereof. Not all such materials may be used for all applications. For example, where light color in the application is desired, carbonaceous materials may not be suitable in all instances because they are black.

The particle size of an absorber should be in the range of from $0.05\mu$ to $5000\mu$, preferably in the range of $10\mu$ to $1500\mu$, where $\mu$ denotes micron. In general, uniform distributions of all the solid components, including the absorber, are preferred.

The amount of an absorber or a mixture of absorbers used in the present invention is in the range of from 0.01 wt % to 90 wt %, based on the total weight of the two- or multi-component coating composition. A preferred range is from 0.1 wt % to 70 wt %, more preferably from 1 wt % to 30 wt %, all ranges being inclusive and combinable. Key parameters to be considered in determining the amount of absorber to be used include: the amount of the binder composition, the type of the binder composition, the water content, the type of absorber, the properties of the absorber, the desired thickness of the film, the paint application conditions (temperature, relative humidity, substrate, history of substrate surface, and combinations thereof), and other ingredients present in the final composition of the paint formulation, and combinations thereof Any ion exchange resin (IER) may be used as the absorber in the present invention. The term "ion exchange resin" is used interchangeably with "IER" herein. In particular, the IERs may have positive or negative ionic moieties, or combinations of positive and negative ionic moieties, attached to their polymer chains. Many IERs in the acid or metal ion form may be used. For the present invention, a preferred IER comprises either a strong acid cation exchange resin or a weak acid cation exchange resin. The acid functional groups may be present in the monomer(s) used and/or they may be generated after polymerization or copolymerization is completed. Crosslinked polymers are preferred. For the present invention, a preferred IER comprises either a strong acid cation exchange resin or a weak acid cation exchange resin. Mixtures of IERs also may be used.

Examples of suitable IER(s) include organic ion exchange resins having sulfonic acid groups (—$SO_3H$, sulfonate functionality), carboxylic acid groups (—COOH, carboxylate functionality), iminodiacetate groups, phosphonic acid groups (—$PO(OH)_2$, phosphonate functionality), alkylaminophosphonic acid groups (aminophosphonate functionality, such as —$NR^1CH_2PO(OH)_2$ where $R^1$ is methyl, ethyl, etc.) and mixtures thereof. Most of the polymers mentioned so far are based on polystyrene or crosslinked polystyrene backbone structures. Crosslinked polyacrylic acid or polymethacrylic acid polymers may be used too. They are weakly acidic. Sulfonic acid groups are generally strong acid groups. Carboxylic-acid-group and sulfonic-acid-group containing IERs are preferred.

The counter ions (cations) to the acid functional group include H+, Li+, Na+, K+, Rb+, Cs+, $NH_4$+, Be++, Mg++, Ca++, Sr++, Ba++, Zn++, Al+++ and mixtures thereof Organic ammonium cations also may be used. Examples include $R^1R^2R^3R^4$N+ where the R's are independently selected from $C_1$–$C_{12}$ alkyl groups, phenyl, substituted phenyl groups, aryl groups and substituted aryl groups, such as $(CH_3)_4N^+$, $(C_2H_5)_4N^+$ and mixtures thereof Examples of commercially available IER's which can be used for the present invention include: AMBERLYST™15, AMBERLYST™131 PDry, AMBERJET™ IR-120H, AMBERLITE™ IRC-84, AMBERLITE™ IRC-84SP, AMBERLITE™ IRC-96K, AMBERLITE™ IRP-64, AMBERLITE™ IRP-69, AMBERLITE™ XE-64W, AMBERJET™1200H, AMBERJET™ HP1110Na, NAFION™ NR50, and mixtures thereof.

The polymer or copolymer backbone of an ion exchange resin is prepared by polymerizing a monomer or co-polymerizing a mixture of monomers. If the acid functional group is not present in at least one of the monomers present, at least one of the monomers must be susceptible to post-polymerization functionalization. One or more of the monomers present also serve as a crosslinking monomer to impart desired physical/chemical properties. Many such properties depend on the degree of polymerization, post-polymerization functionalization conditions, degree of functionalization, and others. In general, lighter colored translucent or opaque IER's are preferred. However, more highly colored IERs may be used where they are incorporated into multilayer, sandwich structures created, for example, by both preceding and following an IER application step with application steps for binder compositions.

Some IER's are translucent. This may be a desirable property. For example, if a some of these lighter colored translucent IERs are visible on the surface of the finished coating, light reflective properties can be enhanced. Thus, translucent IERs may either augment the reflective properties of glass beads used in traffic markings or reduce the amount of glass beads needed, thus reducing the overall cost of applying the paint.

It was also discovered that a "used" or "spent" ion exchange resin may exhibit the same or similar useful absorption characteristics as a new, or fresh, IER when substituted for that new, or fresh, IER. The terms "used" and "spent" are used interchangeably herein to mean a resin has been previously used in other applications or exposed to other chemical reaction conditions. For example, an acid resin such AMBERLYST® 15 which has been previously used as a catalyst in an ether synthesis reaction (such as synthesis of methyl t-butyl ether [MTBE] from methanol and isobutene) may be as effective, or nearly as effective, in the present invention as fresh AMBERLYST™ 15. Similarly, an IER may have been used for other ion-exchange uses. In general, the cost of a used IER is expected to be much lower than that of a fresh IER.

IERs may also provide additional benefits such as antiskid provided that they are used in the quantities and have the particle sizes as disclosed herein.

IER beads may be applied in dry form or they may contain water at levels as high as 95 % by weight, based on total combined weight of the IER solids and the water contained in the IER. The preferred water content is 0 to 40%.

It is also within the scope of the present invention to use a mixture of different resins of the same structure type (different gellular resins or different macroporous types) or different types (one or more gellular types with one or more macroporous types). An example of a gellular IER is AMBERLITE™ IRC-84SP and an example of a macroporous IER is AMBERLITE™ IRC-64.

Absorbers can also be organic superabsorbing polymers (SAPs). The water-absorbent resins of this class heretofore known to the art include partially neutralized crosslinked polyacrylic acids (JP-A-55-84,304, JP-A-55-108,407, JP-A-55-133,413, U.S. Pat. No. 4,654,039, and U.S. Pat. No. 4,286,082), hydrolyzed starch-acrylonitrile graft polymers (JP-A-46-43,995 and U.S. Pat. No. 3,661,815), neutralized starch-acrylic acid graft polymers (JP-A-51-125,468 and U.S. Pat. No. 4,076,663), saponified vinyl acetate-acrylic and U.S. Pat. No. 4,124,748), hydrolyzed acrylonitrile copolymers or acrylamide copolymers (JP-A-53-15,959, U.S. Pat. Nos. 3,935,099 and U.S. Pat. No. 3,959,569), crosslinked derivatives thereof, crosslinked carboxymethyl cellulose (U.S. Pat. Nos. 4,650,716 and U.S. Pat. No. 4,689,408, and crosslinked polymer (JP-A-58-154,709, JP-A-58-154,710, U.S. Pat. No. 4,906,717, U.S. Pat. No. 5, 075,399, and EP-0304,143), crosslinked isobutylene-maleic anhydride copolymers (U.S. Pat. No. 4,389,513), and crosslinked copolymers of 2-acrylamide-2-methylpropanesulfonic acid with acrylic acid (EP-B-068, 189), for example.

Suitable organic super absorbent polymers (SAP's) include polymers prepared from at least one monomer selected from the group consisting of an acrylic monomer, a methacrylic monomer and mixtures thereof, and derivatives such as salts of such polymers. Used herein, the term SAP denotes super absorbent polymer. Examples are partially neutralized crosslinked polyacrylic acids, hydrolyzed starch-acrylonitrile graft polymers, neutralized starch-acrylic acid graft polymers, saponified vinyl acetate-acrylic ester copolymers, hydrolyzed acrylonitrile copolymers or acrylamide copolymers, crosslinked derivatives thereof, crosslinked carboxymethyl cellulose, crosslinked polymers of cationic monomers, crosslinked i-butylene-maleic anhydride copolymers, crosslinked copolymers of 2-acrylamide-2-methylpropanesulfonic acid with acrylic acid, and mixtures thereof The neutralization or partial neutralization may be achieved by reacting a suitable SAP with a base such as sodium hydroxide, potassium hydroxide, ammonium hydroxide, and others.

U.S. Pat. No. 5,075,399 discloses SAPs that are copolymers of ampholytic ion pair monomers and acrylic comonomers including acrylamide, methacrylamide, acrylic acid, methacrylic acid,. salts of acrylic acid, and salts of methacrylic acid. The ampholytic ion pair monomers are, for example, combinations of the ammonium cation 2-methacryloyloxyethyltrimethylammonium and an anion selected from the group consisting of 2-acrylamido-2-methylpropane sulfonate, 2-methacryloyloxyethane sulfonate, vinyl sulfonate, styrene sulfonate and combinations thereof.

U.S. Pat. No. 4,654,039 discloses SAPs that are hydrogel-forming polymer compositions. These SAPs are substantially water-insoluble, slightly crosslinked, partially neutralized polymers prepared from unsaturated polymerizable, acid group-containing monomer and crosslinking agents.

U.S. Pat. No. 4,909,717 discloses water absorbing resin based on acrylic acid and on dialkylaminoalkyl acrylate. The SAP resin includes from 40 to 60% on a molar basis of acrylic acid, all or part of which is in salt form, and 60 to 40% on a molar basis of at least one dialkylaminoalkyl acrylate at least partially in salt form, or quaternized. The SAP resin is polymerized in aqueous solution or inverse emulsion in the presence of at least one free-radical initiator.

Crosslinked polymers and copolymers made from acrylic or methacrylic monomers, particularly acrylic acid and/or methacrylic acid are preferred SAP's. Examples of such monomers include acrylic acid, methacrylic acid, methyl acrylate, methyl methacrylate, and other acrylate and methacrylate esters having $C_2$ to $C_{20}$ alkyl groups. The polymers or copolymers are usually in the carboxylic acid form(—COOH), or completely or partially converted to the carboxylic acid form if ester monomers are used. In addition, as mentioned herein above, some or all of the carboxylic acid functional groups (—COOH) may be neutralized with a metal ion or a base having a cation such as $NH_4^+$, $Li^+$, $Na^+$, $K^+$, $Rb^+$, $Cs^+$, $Be^{++}$, $Mg^{++}$, $Ca^{++}$, $Sr^{++}$, $Ba^{++}$, $Zn^{++}$, $Al^{+++}$ and mixtures thereof. Organic ammonium cations also may be used. Examples include $R^1R^2R^3R^4N^+$ where the R's are independently selected from $C_1$–$C_{12}$ alkyl groups, phenyl, substituted phenyl groups, aryl groups and substituted aryl groups, such as $(CH_3)_4N^+$, $(C_2H_5)_4N^+$ and mixtures thereof. Examples of commercially available SAP materials include AQUALIC® CA (Nippon Shokubai Kagaku Kogyo Co., Ltd.). SAP's in both fibrous and particular forms may be used. SAP's in particulate form (as particles) are preferred. The range of suitable particle size is discussed elsewhere herein.

Yet another type of absorber includes materials like AMBERSORB™, activated carbons, carbon blacks, pyrolyzed polyacrylonitrile or other types of carbonaceous materials. AMBERSORB™ is a registered trademark of Rohm and Haas Company.

Molecular sieves, or molecular sponges, including many natural and synthetic zeolites which have liquid or gas absorption and/or adsorption properties, may be used as the absorber for the present invention. Synthetic zeolites are generally white and natural zeolites may be white, off-white, or colored. Off-white or colored molecular sieves or zeolites may be limited to applications where color of the coating is compatible or not important. Examples of molecular sieves include metal-containing or acid form zeolite or molecular sieve such as 3A, 4A, 5A, 10X, 13X, Y, ZSM-5, ZSM-11, beta, faujasite, erionite, SAPO-5, SAPO-11, SAPO-34, ALPO-5, and mixtures thereof. While the more hydrophobic type zeolites or silicas such as silicalite or high Si/Al atomic ratio (greater than 100) ZSM-5 may be used, they are not particularly preferred for the present invention.

Other inorganic materials such as aluminas, silica-aluminas or their mixtures also may be used alone or in combination with other disclosed absorbers. Examples include aluminas such as α-alumina, γ-alumina, θ-alumina, η-alumina, amorphous silica-aluminas, crystalline silica-aluminas, diatomaceous earth (such as CELITE® or kieselguhr), and mixtures thereof. Materials like kieselguhr also have been known to be useful as extenders by forming a mixture with the binder composition prior to application of the paint. Magnesium silicates such as talc may also be used as absorbers.

The molecular sieves and other inorganic materials are available from a number of companies, including Mobil, Union Carbide, W. R. Grace, Aldrich, Johnson Matthey, and others.

Hollow sphere polymer particles are also useful as absorbers in the present invention. The hollow sphere polymer particles are also referred to herein as voided latex particles. The voided latex particles useful in the method of the invention have a particle size of 50 nm to 2,000 nm and a void fraction of 10% to 75%. The voided latex particles useful in the method of the invention have a particle size of, preferably, 50 nm to 1,100 nm, and, more preferably, 50 to 700 nm. Preferably, the voided latex particles useful in the method of the invention have a single void. All ranges for particle sizes are inclusive and combinable. The particle size and void fraction of the voided latex particles may be determined by conventional techniques known in the art, including microscopy and the Brookhaven Model BI-90 Particle Sizer supplied by Brookhaven Instruments Corporation, Holtsville, N.Y., which employs a quasi-elastic light scattering technique to measure the size of the particles.

The voided latex particles useful in the method of the invention have a glass transition temperature, as measured by differential scanning calorimetry at a rate of 20 Centigrade degrees per minute, of at least 20° C. and, more preferably, of at least 50° C., these ranges being inclusive and combinable. A higher glass transition temperature contributes to a harder particle that is less likely to collapse during storage prior to use.

The voided latex particles useful in the invention may be prepared by conventional polymerization processes known in the art, such as those disclosed in U.S. Pat. No. 3,784,391; U.S. Pat. No. 4,798,691; U.S. Pat. No. 4,908,271; U.S. Pat. No. 4,972,000; EP-B-0,915,108; and Japanese Patent Applications 60/223,873; 61/62510; 61/66710; 61/86941; 62/127336; 62/156387; 01/185311; 02/140272. Preferably, the voided latex particles are prepared according to U.S. Pat. No. 4,427,836; U.S. Pat. No. 4,469,825; U.S. Pat. No. 4,594,363, U.S. Pat. No. 4,880,842 and 5,494,971 and EP-B-0,915,108. Voided latex particles, such as ROPAQUE™ Preferably, the voided latex particles are prepared according to U.S. Pat. No. 4,427,836; U.S. Pat. No. 4,469,825; U.S. Pat. No. 4,594,363, U.S. Pat. No. 4,880,842 and U.S. Pat. No. 5,494,971 and EP-B-0,915,108. ROPAQUE™ OP-62 is available from Rohm and Haas Company of Philadelphia, Pa.

Glass beads, quartz beads, ceramic beads, and mixtures thereof are collectively referred to herein as "glass beads" or "G". Glass beads may be included in one or more of components A, B, and C of the present invention. Glass beads may also be applied in one or more separate steps as component D of the present invention. A primary function of the glass beads is to provide reflective properties to traffic paints or road marking coatings. The particle size of glass beads (G) is in the range of from 50µ (micrometers) to 1500µ, preferably 80µ to 1250µ, more preferably in the range of from 100µ to 1000µ. Glass beads can be obtained from various commercial sources like Potters Industries, Inc. (PQ Corporation), Swarco Industries, Inc., Minnesota Mining and Manufacturing Company (3M), and others. Typical glass beads useful for this application are those described in AASHTO Designation M 247–81(1993), developed by the American Association of State Highway and Transportation Officials (Washington, D.C.). The beads will generally be applied at a rate of 0.72 kg/L to 2.9 kg/L or more of paint for night and adverse weather visibility.

An "auxiliary material" also may be mixed with one or more of components A, B, C, and D to provide additional benefits. It is acceptable to add auxiliary material to one or more of the components of the composition provided that its presence does not cause premature destabilization of either the component or the coating composition as a whole. A portion of the glass beads, quartz beads or ceramic beads which generally provide reflective properties to traffic paints or road marking coatings may be viewed as such an "auxiliary material". This will be true for those glass beads that are completely buried below the surface of the dried traffic paint or road marking to the extent that they do not interact with incident light in a significant way.

Other auxiliary materials may also be combined with any of components A, B, C, and D. These other auxiliary materials include those known to provide anti-skidding properties, such as various forms of quartz silicas. In addition, other auxiliary materials may provide certain physical/chemical benefits such as additional drying acceleration, uniformity of drying, better flow properties, or a combination thereof. It is important that an auxiliary material maintain its desirable performance features and those of omponents A, B, C, and D during application. For this reason, inclusion of some auxiliary materials with certain components (A, B, C, or D) must be avoided. For example, these auxiliary materials include salts that are hygroscopic and/or soluble in water, such as CaCl2, calcium acetate, or acids, such as acetic acid, citric acid and others. It would not be appropriate to combine these hygroscopic substances with aqueous components B or C prior to application to a substrate because those salts would lose their ability to absorb water upon application and because they might destabilize components B or C prior to application. If the auxiliary materials are to be mixed with any of components A, B, C, or D prior to application, they must be chemically and physically compatible with those components.

The absorber, with or without any other auxiliary materials or other substances, and the binder composition must be placed in separate components (packs). The component including the absorber (component A) and the component(s) including the binder composition(s) (components B and C) as part of the coating formulation must be kept separate until the time of application onto the surface of a substrate. Substrates include highway, road, street, runway, parking area, tarmac, pavement and roof, and surface material(s), masonry, asphalt, concrete, cement, stone, metals such as aluminum, stainless steel, carbon steel, etc.

Although talc may itself be used as an absorber, it may also be combined with other absorbers to impart improved flow characteristics and lighter color. Talc is particularly useful in this regard when the absorber is, for example, an IER having a high water content because the talc prevents the moisture laden IER beads from adhering to one another, a condition that would adversely manifest itself as clumping, compacting, and bridging during storage and application.

Table I sets forth several ways by which "G" and the components A, B, C, and D may be applied to a substrate in a series of sequential steps. As noted supra, when glass beads are added in a step that does not include any of the components A, B, or C, those glass beads are defined as included in component D as shown in Table I. When glass beads are added in one of the sequential steps with one or more of components A, B, and C (i.e., when added simultaneously, or nearly simultaneously, with one or more of components A, B, and C), those glass beads are denoted by "G", as shown in Table I. When more than one of "G" and components A, B, and C are being added in a single sequential step, a comma is used in Table I to denote simultaneous, or nearly simultaneous, addition. Inclusion in parentheses further denotes premixing. Although not explicitly stated in Table I, it is also within the scope of the present invention that any of the sets of sequential steps of any method of Table I may be repeated one or more times or in combination with other steps in other methods. In other words, it is understood that there are other variations that may be used that repeat one or more of the steps. Further, it is possible to use component A in multiple steps of a single method provided that component A is not premixed with either component B or component C.

TABLE I

| | Order of Application of Components | | | |
|---|---|---|---|---|
| Method | Step 1 | 2 | 3 | 4 |
| 1 | A, B | | | |
| 2 | A, B, G | | | |
| 3 | (A, G), B | | | |
| 4 | A, (B, G) | | | |
| 5 | A, B | D | | |
| 6 | B | A | | |
| 7 | B, G | A | | |
| 8 | (B, G) | A | | |
| 9 | B | A, G | | |
| 10 | B | (A, G) | | |
| 11 | B | D | A | |
| 12 | B | A | D | |
| 13 | B, G | A | | |
| 14 | (B, G) | A | | |
| 15 | A | B | | |
| 16 | A, G | B | | |
| 17 | (A, G) | B | | |
| 18 | A | B, G | | |
| 19 | A | (B, G) | | |
| 20 | A | D | B | |
| 21 | A | B | D | |
| 22 | C | A | B | |
| 23 | C, G | A | B | |
| 24 | (C, G) | A | B | |
| 25 | C | A, G | B | |
| 26 | C | (A, G) | B | |
| 27 | C | A | B, G | |
| 28 | C | A | (B, G) | |
| 29 | C | D | A | B |
| 30 | C | A | D | B |
| 31 | C | A | B | D |
| 32 | B | C, A | | |
| 33 | B, G | C, A | | |
| 34 | (B, G) | C, A | | |
| 35 | B | C, A, G | | |

TABLE I-continued

| | Order of Application of Components | | | |
|---|---|---|---|---|
| Method | Step 1 | 2 | 3 | 4 |
| 36 | B | C, (A, G) | | |
| 37 | B | (C, G), A | | |
| 38 | B | D | C, A | |
| 39 | B | C, A | D | |
| 40 | A | B | C | |
| 41 | A, G | B | C | |
| 42 | (A, G) | B | C | |
| 43 | A | B, G | C | |
| 44 | A | (B, G) | C | |
| 45 | A | B | C, G | |
| 46 | A | B | (C, G) | |
| 47 | A | D | B | C |
| 48 | A | B | D | C |
| 49 | A | B | C | D |
| 50 | B, A | C | | |
| 51 | B, A, G | C | | |
| 52 | B, (A, G) | C | | |
| 53 | (B, G), A | C | | |
| 54 | B, A | C, G | | |
| 55 | B, A | (C, G) | | |
| 56 | B, A | D | C | |
| 57 | B, A | C | D | |

Step 1 precedes Step 2, followed by Step 3 and then Step 4. Components in parentheses are pre-mixed prior to application. If two or more components are in the same step box, these components are applied simultaneously, or substantially simultaneously.

A: Component A, including absorber;
B: Component B, including binder;
C: Component C, including binder;
D: Component D, including glass beads;
G: glass beads The paint or coating, particularly the component containing the binder composition, can be applied to the surface of a substrate by a number of ways known to those having ordinary skill in the art. Some examples are brushing, spraying, extrusion, and combinations thereof. All of these different ways are collectively referred to as "spraying" or "application" herein.

All of the methods of application listed in Table I are useful embodiments of the present invention. Of the methods of application listed in Table I, those in which component A is applied either during or after the first step in which either of components B or C is applied are preferred (methods 1–14, 22–39 and 50–57). More preferred are methods in which component A is applied after the first step in which either of components B or C is applied (methods 6–14 and 22–39). Most preferred are methods including both component B and component C in which component A is applied after the step including the first applied of components B and C, and before or during the step including the second applied of components B and C (methods 22–39). All of these ranges relating the steps of incorporation of components A, B, and C are inclusive and combinable.

It is believed that coating the surface of the substrate with slow-drying aqueous binder composition prior to, or during application of absorber reduces the tendency of the absorber to bounce away from that surface, with possible concomitant loss of fast-drying capability. It is further believed that applying a second slow-drying aqueous binder composition in a step subsequent to application of absorber is particularly effective at trapping the absorber in intimate contact with the slow-drying aqueous binder composition so that the ability of the absorber to speed drying is maximized.

To maximize the retro-reflective capability of the glass beads, addition of those glass beads in one of the last two steps of any method is preferred, more preferred is addition of glass beads in the last applied step, and most preferred is addition of glass beads as component D (i.e., in a step excluding components B and C) in the last applied step. All of these ranges relating the steps of incorporation glass beads with the steps of incorporation of components A, B, and C are inclusive and combinable.

The absorber may be applied in conjunction with the acid or salt solution treatments disclosed in EP-B-0,200,249 and described herein above. If chemically and physically compatible, the absorber particles may be mixed with a salt or an acid prior to application. Alternatively, they can be kept separate and applied separately.

Absorber may, in addition, be applied after the application of the paint has been completed. Exercise of this option may be particularly useful for road-marking paint. This use can be by design, or as a remedial step. The term "remedial step" means that if a road-marking crew has applied by the usual means a waterborne road-marking paint and they find that it is not drying quickly enough, they can accelerate drying by applying the absorber particles in accordance with the invention. One such situation is in the case of a waterborne road-marking operation which commences under favorable climatic conditions (e.g. 20° C. and 50% relative humidity), but is being finished under unfavorable conditions such as a lower temperature of 10 C. and a higher relative humidity of 85%. The more recently applied waterborne road markings will dry more slowly than expected and this will cause prolonged traffic flow interruption. In such a case, the road-marking crew can post-treat the more recently applied road-markings with the absorber particles. This will cause an increase of drying rate of the more recently applied waterborne road-markings and allow faster resumption of normal traffic flow.

AMBERJET™, AMBERLYST™, AMBERLITE™, AMBERSORB™, AND ROPAQUE™, are trademarks of Rohm and Haas Company, NAFION™ is a trademark of E. I. duPont De Nemours and Company, CELITE™ is a trademark of Johns-Manville Corporation, and AQUALIC® is a trademark of Nippon Shokubai Kagaku Kogyo Co., Ltd.

EXAMPLES

Examples 1–3 (Table II) were carried out in the following manner:

Dry Through Tests

Each test paint was applied to a 4" (10.2 cm)×12" (30.5 cm) glass panel using a drawdown blade having a gap of 20 mils (500?), followed immediately by the application of a given absorber to a section of the panel. A drawdown blade gap of 500? delivers a wet film thickness of 330?? to the surface of the glass panel. Each absorber was applied in such a fashion that it covered about one third (⅓) of the coated glass panel, with another ⅓ covered by one of the glass bead types, and the other third remaining untreated. Absorbers were applied using a hand shaker such that the coverage of the absorber was evenly distributed across the surface, and applied in an amount approximating 100 g per m² of paint surface area. Glass beads were applied at a similar coverage density, which corresponds to about 250 g of glass beads per m² of paint surface area.

After application of the coating, with and without the treatment of absorber and glass beads, the panels were then immediately placed in a high humidity test chamber supplied by Victor Associates, Inc. (Hatboro, Pa), maintained at a relative humidity of 90% ±3%. This test chamber is equipped with a certified hygrometer and temperature indicator, both of which were fastened to the center of the rear wall of the test chamber to ensure balanced measurement. The 90% ±3% relative humidity was obtained by filling the pan at the bottom of the completely closed test chamber with a 1 inch layer of water, equilibrating the chamber overnight (about 16 hours) before testing (bringing the relative humidity inside the chamber to 100%), and then adjusting the size of the side port openings to achieve a relative humidity of 90% ±3% within the chamber. The temperature inside the test chamber was 23° C. (74° F.).

The door of the test chamber was opened briefly at 5-minute intervals to evaluate the dry through time for the paint test panel on each of the three test areas (absorber, glass, and untreated). Dry through time is defined as the time it takes for a wet paint film to reach a state such that the paint cannot be distorted with a 90° thumb twist when the thumb is touching the paint surface, but no pressure is being applied. During the early stages of drying, dry through is assessed by pushing a small applicator stick through the surface of the film to the substrate, and then gauging the dryness of the coating in the lower layer by dragging the applicator stick along the substrate for a length of approximately 0.5 inch (~1.27 cm). As it becomes clear that the coating is approaching a dried through state, the panel is then removed from the box at the appropriate time, and the aforementioned 90° thumb twist test is conducted. The drying rates of Table II are the dry through times as determined by the 90° thumb twist test.

TABLE II

Drying Rates for Examples 1–3

| Application | Example 1 (Comparative) | Example 2 (Comparative) | Example 3 |
|---|---|---|---|
| 1st step | 330 mμ paint[a] | 330 mμ paint[a] | 330 mμ paint[a] |
| 2nd Step | | 250 g/m² glass beads[b] | 100 g/m² IRC-84SP[c] |
| Drying Rate: | >>120 min. | >>120 min. | 25 min. |

[a]The binder is Rhoplex AC-630 available from Rohm and Haas Company, Philadelphia, Pennsylvania. Application of the paint using a drawing shoe having a gap of 500 mμ (20 mils) creates a wet film with a thickness of 330 mμ.
[b]The glass beads are P-35 beads available from Potters Industries, Inc.
[c]AMBERLITE ™ IRC-84SP is an IER available from Rohm and Haas Company, Philadelphia, Pennsylvania.

These examples show that addition of the selected absorber under the disclosed conditions improved (accelerated) drying of an otherwise slow-drying aqueous binder composition, resulting in a fast-drying multi-component waterborne coating composition.

All the examples herein are intended for illustrative purposes only. They are not intended to limit the spirit or scope of the present invention which is defined by the claims.

We claim:

1. A method for preparing a fast-drying multi-component waterborne coating on a surface of a substrate, comprising the steps of:
separately applying component A and component B, either simultaneously, or nearly simultaneously, to the surface of said substrate,
wherein
a) said component A comprises at least one water insoluble absorber; and
b) said component B comprises a slow-drying aqueous binder composition; and allowing the multi-component waterborne coating to dry, wherein said absorber is selected from the group consistng of organic super absorbent polymers, ion-exchange resins, hollow sphere polymers, molecular sieves, talcs, inorganic absorbers, porous carbonaceous materials, non-porous carbonaceous materials, and mixtures thereof.

2. The method of claim 1, further comprising the additional sequential step of applying component C comprising a slow-drying aqueous binder composition to the surface of the substrate to which said component A and said component B have been applied.

3. A method for preparing a fast-drying multi-component waterborne coating on a surface of a substrate, the method comprising the sequential steps of:

a) applying component A comprising at least one water insoluble absorber to the surface of the substrate;

b) applying component B comprising a slow-drying aqueous binder composition to the surface of the substrate to which the water insoluble absorber has been applied; and c) allowing the multi-component waterborne coating to dry,
wherein said absorber is selected from the group consisting of organic super absorbent polymers, ion-exchange resins, hollow sphere polymers, molecular sieves, talcs, inorganic absorbers, porous carbonaceous materials, non-porous carbonaceous materials, and mixtures thereof.

4. The method of claim 3, further comprising the additional sequential step of applying component C comprising a slow-drying aqueous binder composition to the surface of the substrate before applying said component A water insoluble absorber.

5. The method of claim 4, further comprising the step of applying component D comprising glass beads before applying said component C.

6. The method of claim 3, further comprising the additional sequential step of applying said component C comprising a slow-drying aqueous binder composition to the surface of the substrate to which said component A and said component B have been applied.

7. A method for preparing a fast-drying multi-component waterborne coating on a surface of a substrate, the method comprising the sequential steps of:

a) applying component B comprising a slow-drying aqueous binder composition to the surface of said substrate;

b) applying component A comprising at least one water insoluble absorber to the surface of the substrate to which said component B has been applied; and c) allowing the multi-component waterborne coating to dry,
wherein said absorber is selected from the group consisting of organic super absorbent polymers, ion-exchange resins, hollow sphere polymers, molecular sieves, talcs, inorganic absorbers, porous carbonaceous materials, non-porous carbonaceous materials, and mixtures thereof.

8. The method of claim 7, further comprising applying component C comprising a slow-drying aqueous binder composition simultaneously, or nearly simultaneously, with said component A, wherein said component A and said component C are applied separately.

9. The method of any one of claims 1, 2, 3, 4, 6, 7 or 8 wherein said component B further comprises glass beads.

10. The method of any one of claims 2, 4, 6, or 8 wherein said component C further comprises glass beads.

11. The method of any one of claims 1, 2, 3, 6, 7, or 8 further comprising the step of applying component D comprising glass beads before applying the first applied of said components A and B.

12. The method of any one of claims 1, 2, 3, 4, 6, 7 or 8 wherein said component A further comprises glass beads.

13. The method of any one of claims 3 or 7, further comprising the step of applying said component D comprising glass beads between of any two steps of applying said components A and B.

14. The method of any one of claims 2, 4, 6, or 8 further comprising the step of applying said component D comprising glass beads between of any two steps of applying said components A, B, and C.

15. The method of any one of claims 1, 3, or 7 further comprising the step of applying component D comprising glass beads after applying the last applied of said components A and B.

16. The method of any one of claims 2, 4, 6, or 8 further comprising the step of applying component D comprising glass beads after applying the last applied of said components A, B, and C.

17. The method of any one of claims 1, 2, 3, 4, 6, 7, or 8 wherein when said component A comprises at least one water insoluble ion exchange resin, said ion exchange resin comprises acid functional groups, and wherein said acid functional groups are selected from the group consisting of sulfonic acid groups, salts of sulfonic acid groups, carboxylic acid groups, sales of carboxylic acid groups, phosphonic acid groups, salts of phosphonic acid groups, alykylaminophosphonic acid groups, salts of alykylaminophosphonic acid groups and mixtures thereof.

18. The method of any one of claims 1, 2, 3, 4, 6, 7, or 8 wherein when said component A comprises at least one water insoluble ion exchange resin, the ion exchange resin is transparent or translucent.

19. The method of any one of claims 1, 2, 3, 4, 6, 7, or 8 wherein when said component A comprises at least one water insoluble organic super absorbent polymer, said organic super absorbent polymer comprises a polymer prepared from at least one monomer selected from the group consisting of acrylic monomer, methacrylic mononer, and mixtures thereof.

20. The method of any one of claims 1, 2, 3, 4, 6, 7, or 8 further comprising the step of applying an aqueous solution which comprises a substance selected from the group consisting of an acid, a water soluble salt and mixtures thereof, wherein the acid is selected from the group consisting of acetic acid, citric acid and mixtures thereof.

21. The method of any one of claims 1, 2, 3, 4, 6, 7 or 8 wherein the multi-component waterborne coating is a multi-component waterborne road marking paint.

22. A composite formed by the method of any one of claims 1, 2, 3, 4, 6, 7, or 8.

* * * * *